United States Patent
Kawakami

[11] Patent Number: 6,038,501
[45] Date of Patent: Mar. 14, 2000

[54] AUTONOMOUS VEHICLE CAPABLE OF TRAVELING/STOPPING IN PARALLEL TO WALL AND CONTROLLING METHOD THEREOF

[75] Inventor: Yuichi Kawakami, Itami, Japan

[73] Assignee: Minolta Co., Ltd., Osaka, Japan

[21] Appl. No.: 09/031,041

[22] Filed: Feb. 26, 1998

[30] Foreign Application Priority Data

Feb. 27, 1997 [JP] Japan ..................... 9-043901

[51] Int. Cl.[7] ........................... G06F 165/00; G05D 1/02
[52] U.S. Cl. ..................... 701/23; 701/217; 701/220; 701/205
[58] Field of Search ............... 701/23, 217, 205, 701/300, 220; 318/587; 180/167, 168, 169; 901/1

[56] References Cited

U.S. PATENT DOCUMENTS

| | | | |
|---|---|---|---|
| 4,119,900 | 10/1978 | Kremnitz | 701/23 |
| 4,515,221 | 5/1985 | Lely | 172/3 |
| 4,674,048 | 6/1987 | Okumura | 701/25 |
| 4,700,302 | 10/1987 | Arakawa et al. | 701/25 |
| 5,032,775 | 7/1991 | Mizuno et al. | 701/25 |
| 5,479,079 | 12/1995 | Jeong et al. | 318/568.12 |
| 5,896,488 | 4/1999 | Jeong | 395/90 |

FOREIGN PATENT DOCUMENTS

| | | |
|---|---|---|
| 63-263505 | 10/1988 | Japan . |
| 03160507 | 7/1991 | Japan . |
| 04084207 | 3/1992 | Japan . |
| 04260905 | 9/1992 | Japan . |
| 5-17703 | 3/1993 | Japan . |
| 8-194536 | 7/1996 | Japan . |

OTHER PUBLICATIONS

G.F. Schwind; Trends in Automatic Guided Vehicle Systems; Material Handling Engineering; vol. 51, iss. 5; May 1996.

*Primary Examiner*—Michael J. Zanelli
*Attorney, Agent, or Firm*—McDermot, Will & Emery

[57] ABSTRACT

An autonomous vehicle capable of traveling and stopping parallel to a wall includes right and left driving wheels receiving driving force to be driven independently, a dependent wheel for supporting the autonomous vehicle together with the driving wheels for a straightforward movement and a U-turn, a motor for driving the right and left driving wheels, a coupling mechanism for transmitting the rotation of the motor to the driving wheels, an encoder for detecting the rotation amount and velocity of the motor, a gyro sensor for detecting the direction of the autonomous vehicle, a distance measurement sensor for measuring the distance to a right or left object of interest, and a controller for controlling the autonomous vehicle through the motor and the driving wheels. The controller receives the output of the encoder, calculates a control value for the driving wheels based on the rotation amount and rotation velocity of the motor, and determines that the autonomous vehicle travels parallel to the wall if the ratios of a time period to turn the autonomous vehicle rightward and a time period to turn the vehicle leftward in a prescribed time period are equal based on the control value.

19 Claims, 8 Drawing Sheets

AUTONOMOUS VEHICLE CAPABLE OF TRAVELING/STOPPING IN PARALLEL TO WALL AND CONTROLLING METHOD THEREOF

This application is based on application No. 9-043901 filed in Japan, the content of which is hereby incorporated by reference.

BACKGROUND OF THE INVENTION

1. Field of the Invention

The present invention relates generally to autonomous vehicles and controlling method thereof, and more particularly, to an autonomous vehicle which travels/stops parallel to a wall and a controlling method thereof.

2. Description of the Related Art

Autonomous vehicles have been extensively studied in recent years. There is known for example an autonomous vehicle which waxes all over a floor by repeating a straight-forward movement and a U-turn. An example of a method of controlling such an autonomous vehicle is to control a straightforward and turning movement by detecting the number of rotation of its wheels. Such an autonomous vehicle requires improvements in the precision of straight-forward movement and the rotation movement as the vehicle makes a U-turn. The autonomous vehicle using the controlling method is not necessarily capable of accurate operation if its wheels slip on a floor. An autonomous vehicle disclosed by Japanese Patent Laying-Open No. 3-160507 is directed to a solution to this problem. This conventional autonomous vehicle measures the distance between a wall and itself using a distance measurement sensor to produce the position and direction of itself and travels parallel to the wall.

Such an autonomous vehicle which moves only based on the distance information between the wall and itself cannot accurately detect the direction of the vehicle body. Therefore, while the vehicle generally travels along a wall, the direction of the vehicle body is not always exactly parallel to the wall, and does not necessarily stop exactly parallel to the wall. If the vehicle is to wax all over a floor as described above, the vehicle repeat the operation of crossing the floor, making a 180° turn and proceeding parallel to the previous course in the opposite direction. Unless the direction of the body is parallel to the wall when one straightforward travel completes, the operation during such traveling will be instable.

Furthermore, in order to thoroughly wax the area along the wall, the initial position of the body should be strictly specified. Depending upon the initial position of the body, the unsteadiness of the body during traveling could be large.

SUMMARY OF THE INVENTION

The present invention is directed to a solution to these problems, and it is an object of the invention to provide an autonomous vehicle capable of stop traveling in a state not shifted from a parallel state at the start of traveling, when it cannot be surely determined if the body is parallel to the wall at the end of the traveling, and a method of controlling such an autonomous vehicle.

Another object of the invention is to provide an autonomous vehicle capable of stop traveling in a state not shifted from a parallel state at the start of traveling, when it cannot be surely determined if the body is parallel to the wall at the end of traveling and capable of traveling parallel to the wall if the body slips on a floor.

Yet another object of the invention is to provide an autonomous vehicle capable of stop traveling parallel to a wall at the end of traveling, in a state not shifted from a parallel state at the start of traveling, when it cannot be surely determined if the body is parallel to the wall and capable of traveling parallel to the wall if the body slips on a floor.

Still another object of the invention is to provide an autonomous vehicle capable of stop traveling parallel to a wall at the end of traveling, in a state not shifted from a parallel state at the start of traveling when it cannot be surely determined if the body is parallel to the wall, capable of traveling parallel to the wall if the body slips on a floor, and capable of directly determining a parallel state between the body and the wall.

A still further object of the invention is to provide an autonomous vehicle capable of stop traveling parallel to a wall at the end of traveling, in a state not shifted from a parallel state at the start of traveling, when it cannot be surely determined if the body is parallel to the wall, capable of traveling parallel to the wall if the body slips on a floor, and capable of stably determining a parallel state between the body and the wall.

A still further object of the invention is to provide an autonomous vehicle capable of traveling and stopping parallel to a wall at a high precision.

A still further object of the invention is to provide an autonomous vehicle capable of generally specifying a position to start operating along a wall, capable of stopping at the end of traveling in a state not shifted from a parallel state at the start of traveling, when it cannot be surely determined if the body is parallel to the wall, and capable of traveling parallel to the wall if the body slips on a floor.

An additional object of the invention is to provide an autonomous vehicle always capable of traveling and stopping parallel to a wall at a high precision.

An autonomous vehicle according to one aspect of the invention includes a body, a direction detection unit for detecting the moving direction of the body, a driving unit for moving the body, and a control unit for controlling the driving unit to move straightforward and/or turn the body. The control unit includes a first direction correction unit which receives the output of the direction detection unit to correct the direction of the body after traveling based on the difference between the directions of the body before and after traveling.

If the body does not travel parallel to a wall, the direction of the body after traveling can be equal to the direction of the body before traveling. Thus, when it cannot be surely determined if the body is parallel to the wall at the end of traveling, the body will stop traveling in a state not shifted from a parallel state at the start of traveling.

The autonomous vehicle preferably further includes a distance detection unit attached to the body to measure the distance from a wall positioned on a side of the body. The control unit further includes a parallel traveling control unit which receives the output of the distance detection unit to control the body to travel parallel to the wall.

Using the distance detection unit, the vehicle is controlled to travel parallel to a wall while continually measuring the distance from the wall. Thus, when it cannot be surely determined if the body is parallel to the wall at the end of traveling, the vehicle will stop in a state not shifted from a parallel state at the start of traveling and can travel parallel to the wall if the body slips on a floor.

More preferably, the autonomous vehicle includes a distance measurement tracing determination unit for determining that the body travels parallel to the wall for a prescribed time period under the control of the parallel traveling control unit. The control unit includes an average direction calculation unit for calculating the average direction of the body for a fixed time period based on an output received from the direction detection unit after receiving the determination result from the distance measurement tracing determination unit that the body travels parallel to the wall, a second direction correction unit for correcting a direction after traveling based on the difference between the average direction output from the average direction calculation unit and a direction after traveling output from the direction detection unit, and a stop mode changing unit for correcting the direction after traveling by the first direction correction unit if the body stops traveling before the average direction of the body is produced by the average direction calculation unit, and correcting the direction after traveling by the second direction correction unit if the body stops traveling after the average direction of the body is produced by the average direction calculation unit.

After traveling, the direction of the body is corrected to be parallel to the wall. Thus, the direction of the body at the start of next traveling is corrected to be parallel to the wall, when the vehicle makes a U-turn during reciprocating within a work area, it can start traveling in a state substantially parallel to the wall. Therefore, the vehicle can stop traveling to be parallel to a wall at the end of traveling in a state not shifted from a parallel state at the start of traveling, when it cannot be surely determined if the body is in parallel to the wall, and the vehicle can travel parallel to the wall if the body slips on a floor.

More preferably, the distance measurement tracing determination unit determines that the body travels parallel to a wall if the difference between the maximum and minimum values of the distance output from the distance detection unit within a prescribed time period is in the range of prescribed values.

Using the distance detection unit, traveling is controlled while making a distance measurement tracing determination as to if the distance from the wall at a fixed value. Thus, the vehicle can stop traveling parallel to the wall at the end of traveling in a state not shifted from a parallel state at the start of traveling when it cannot be surely determined if the body is parallel to the wall, and can travel parallel to the wall if the body slips on a floor. Furthermore, the distance detection unit is used to make a parallel state determination to the wall, and therefore the parallel state between the body and the wall may be directly determined.

More preferably, the control unit further includes a unit for calculating a rightward or leftward moving direction control period during which a control signal to move the body rightward or leftward is output. The distance measurement tracing determination unit determines that the body travels parallel to the wall if the ratios of a rightward moving direction control period and a leftward moving direction control period in a prescribed period are almost equal.

The ratio of the leftward and rightward traveling control amounts of the autonomous vehicle is used to make a distance measurement tracing determination. If the body moves uncertainly between the right and left because of time delay until a control by the control unit is actually reflected on the operation of the driving unit, the amounts of traveling control to the right and left are virtually identical, as long as the body travels generally straightforward. Therefore, when it cannot be surely determined if the body is parallel to the wall at the end of traveling, the body can stop traveling parallel to the wall in a state not shifted from a parallel state at the start of traveling and can travel parallel to the wall if the body slips on a floor, and the parallel state between the body and the wall may be stably determined using the ratio of the traveling control amount.

More preferably, the control unit further includes a third direction correction unit for correcting the direction of the body during traveling based on the average direction and a direction during traveling output from the direction detection unit after the average direction of the body is produced by the average direction calculation unit. Furthermore, the stop mode changing unit corrects the direction after traveling using the first direction correction unit if the body stops traveling before the average direction of the body is obtained, and corrects the direction after traveling by the second direction correction unit if the body stops traveling before the direction correction during traveling is started by the third direction correction unit after the average direction of the body is obtained by the average direction calculation unit, and the direction correction after traveling is not performed if the body stops traveling thereafter.

After it is determined that the body travels parallel during a period, the average direction of the body during the period is used to control traveling and stopping. Hence, the body always heads in the same direction and does not travel while moving uncertainly between the right and left. Therefore, the vehicle can travel and stop parallel to the wall at a high precision.

Further preferably, the autonomous vehicle further includes a distance contact detection unit attached to the body for measuring the distance from the wall in contact with the wall. The distance detection unit includes a distance non-contact detection unit for measuring the distance from the wall in a non-contact state. The control unit includes a contact parallel traveling control unit for controlling the body to travel parallel to the wall based on an output received from the distance contact detection unit, and a unit receiving the distance between the body and the wall before traveling output from the distance non-contact detection unit for starting the body to travel from that position by the parallel traveling control unit if the distance is larger than a prescribed value, and for moving the body until the distance contact detection unit is in contact with the wall, and then starting the body to travel by the contact parallel traveling control unit if the distance is smaller than that prescribed value.

If the distance from the wall before traveling is smaller than the prescribed value, the body is moved to the position to be in contact with the wall, and then start traveling followed by traveling under the control of the contact parallel traveling control unit. Thus, when an operation along a wall is to be performed, an operation starting position does not have to be strictly specified, in other words the starting position may be roughly specified. Furthermore, when it cannot be surely determined if the body is parallel to the wall at the end of traveling, the vehicle can stop in a state not shifted from a parallel state at the start of traveling and can travel parallel to the wall if the body slips on a floor.

More preferably, the control unit further includes a wall angle change detection unit for detecting the angle formed between the moving direction of the body and the wall being changed based on an output received from the distance detection unit. The parallel traveling control unit responds to the output of the wall direction change detection unit to resume controlling the body to travel parallel to the wall by the parallel control unit.

If the angle formed between the moving direction of the body and the wall changes, traveling control using the distance detection unit is resumed. Thus, the vehicle may always travel and stop parallel to the wall at a high precision.

An autonomous vehicle according to another aspect of the invention includes a body, a driving wheel, a gyro sensor attached to the body to detect the direction of the body, a motor to drive the driving wheel, and a control unit to control the motor to move straightforward and/or turn the body. The control unit receives the output of the gyro sensor and corrects the direction of the body after traveling depending upon the difference between the direction before traveling and the direction after traveling.

When the body does not travel parallel to the wall, the direction of the body after traveling may be equal to the direction of the body before traveling. Thus, when it cannot be surely determined if the body is parallel to the wall at the end of traveling, the vehicle will stop in a state not shifted from a parallel state at the time of traveling.

Preferably, the autonomous vehicle further includes a distance detection sensor attached to the body to measure the distance from a wall positioned facing a side of the body. The control unit receives the output of the distance detection sensor to control the body to travel parallel to the wall.

Using the distance detection sensor, the vehicle is controlled to travel parallel to the wall while continually measuring the distance from the wall. Thus, the vehicle stops in a state not shifted from a parallel state at the start of traveling when it cannot be surely determined if the body is parallel to the wall at the end of traveling, and can travel parallel to the wall if the body slips on a floor.

A method of controlling an autonomous vehicle according to yet another aspect of the invention controls an autonomous vehicle having a driving wheel by controlling the driving wheel to travel and turn the body in an arbitrary direction and includes the steps of direction detection for detecting the direction of the body before traveling, determining that the direction of the body after traveling is different from the direction of the body before traveling and correcting the direction of the body by a prescribed amount to operate the driving wheel to be in coincidence with the direction of the body before traveling.

The vehicle can therefore stop traveling to be parallel to the wall in a state not shifted from a parallel state at the start of traveling when it cannot be surely determined if the body is parallel to the wall at the end of traveling.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An autonomous vehicle according to one embodiment of the invention will be described in conjunction with the accompanying drawings.

Figure 1:
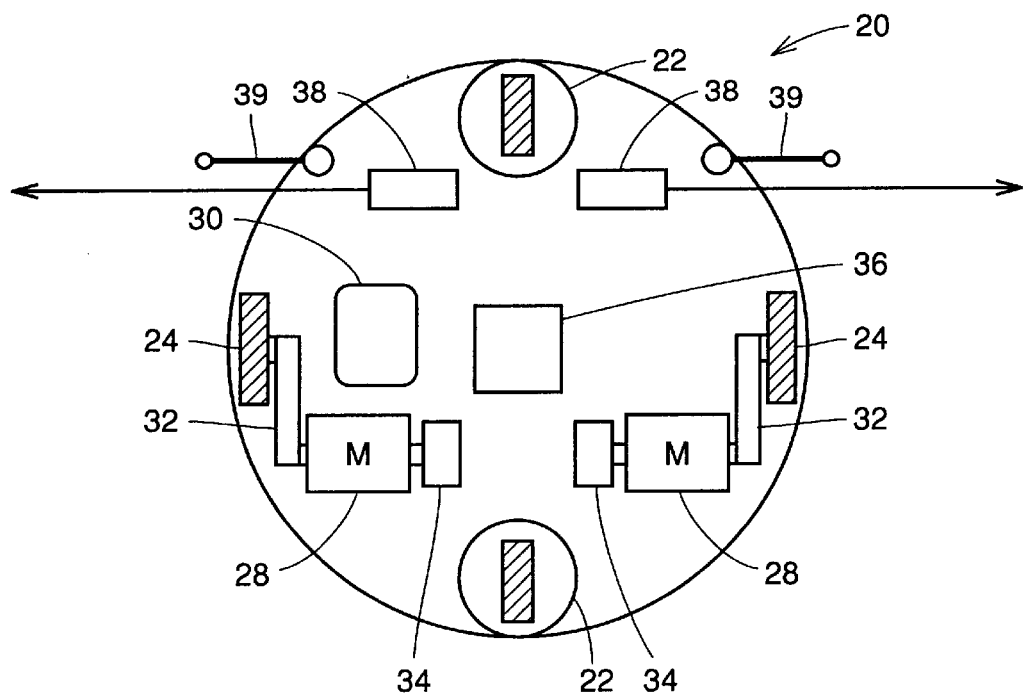
FIG. 1 is a diagram showing an autonomous vehicle according to one embodiment of the invention.

Referring to FIG. 1, autonomous vehicle 20 includes right and left driving wheels 24 provided with driving force to be independently driven, dependent wheels 22 to support autonomous vehicle 20 together with driving wheels 24 and to make a straightforward movement and a U-turn, motors 28 to drive right and left wheels 24, a coupling mechanism 32 to transmit the rotation of motor 28 to driving wheel 24, an encoder 34 for detecting the amount and speed of rotation of motor 28, a gyro sensor 36 for detecting the direction of autonomous vehicle 20, a distance measurement sensor 38 for measuring the distance to a right or left object of interest in a non-contact state, a contact distance measurement sensor 39 for measuring the distance to a right or left object of interest in contact, and a controller 30 for controlling the traveling of autonomous vehicle 20 through motor 28 and driving wheels 24.

Figure 2:
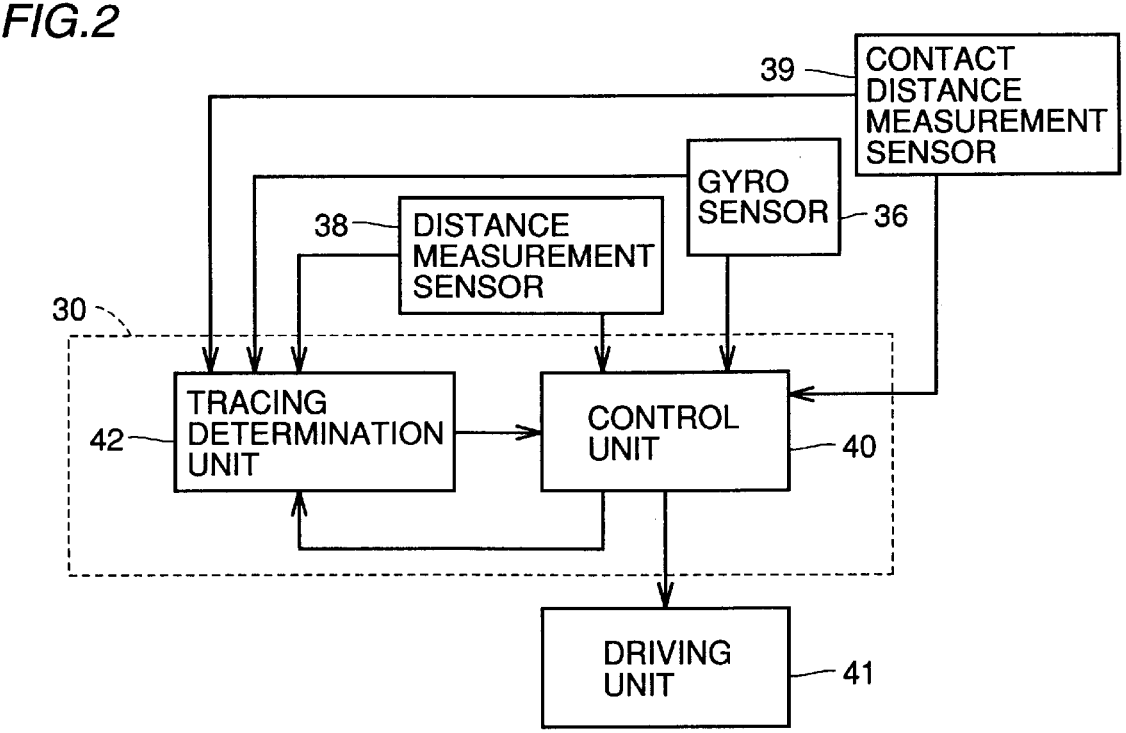
FIG. 2 is a control block diagram showing the autonomous vehicle according to the embodiment of the invention.

Referring to FIG. 2, controller 30 includes a tracing determination unit 42 which receives the direction of autonomous vehicle 20 output from gyro sensor 36 and the distance between autonomous vehicle 20 and a wall output from distance measurement sensor 38 or contact distance measurement sensor 39 and determines whether or not autonomous vehicle 20 traveling tracing the wall, and a control unit 40 for producing control values such as the rotation amount and a velocity of motor 28 based on the above-described direction, the distance and a result of determination by tracing determination unit 42 to control driving unit 41 and tracing determination unit 42.

Driving unit 41 includes driving wheel 24, motor 28 and coupling mechanism 32.

Referring to FIGS. 3 to 9, the operation of autonomous vehicle 20 will be described. There are given in FIG. 3, sequentially from the top, a graph showing a traveling trajectory of autonomous vehicle 20, a graph showing the distance between autonomous vehicle 20 and a wall available from distance measurement sensor 38, and a graph showing a control value to control driving unit 41 and a graph showing the direction of autonomous vehicle 20 available from gyro sensor 36.

Figure 3:
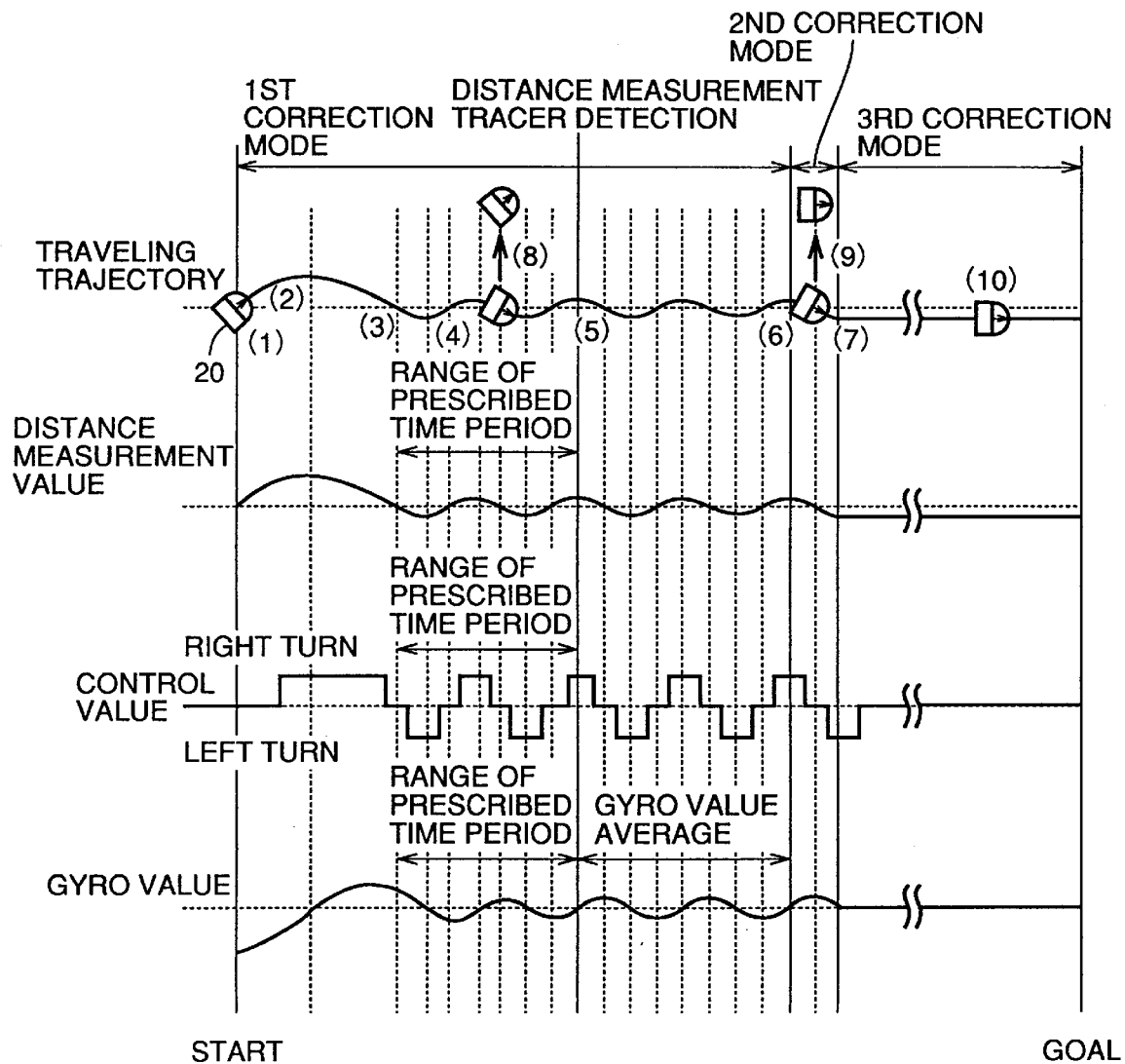
FIG. 3 includes graphs showing a traveling trajectory and measured values of the autonomous vehicle according to the embodiment of the invention.
Figure 4:
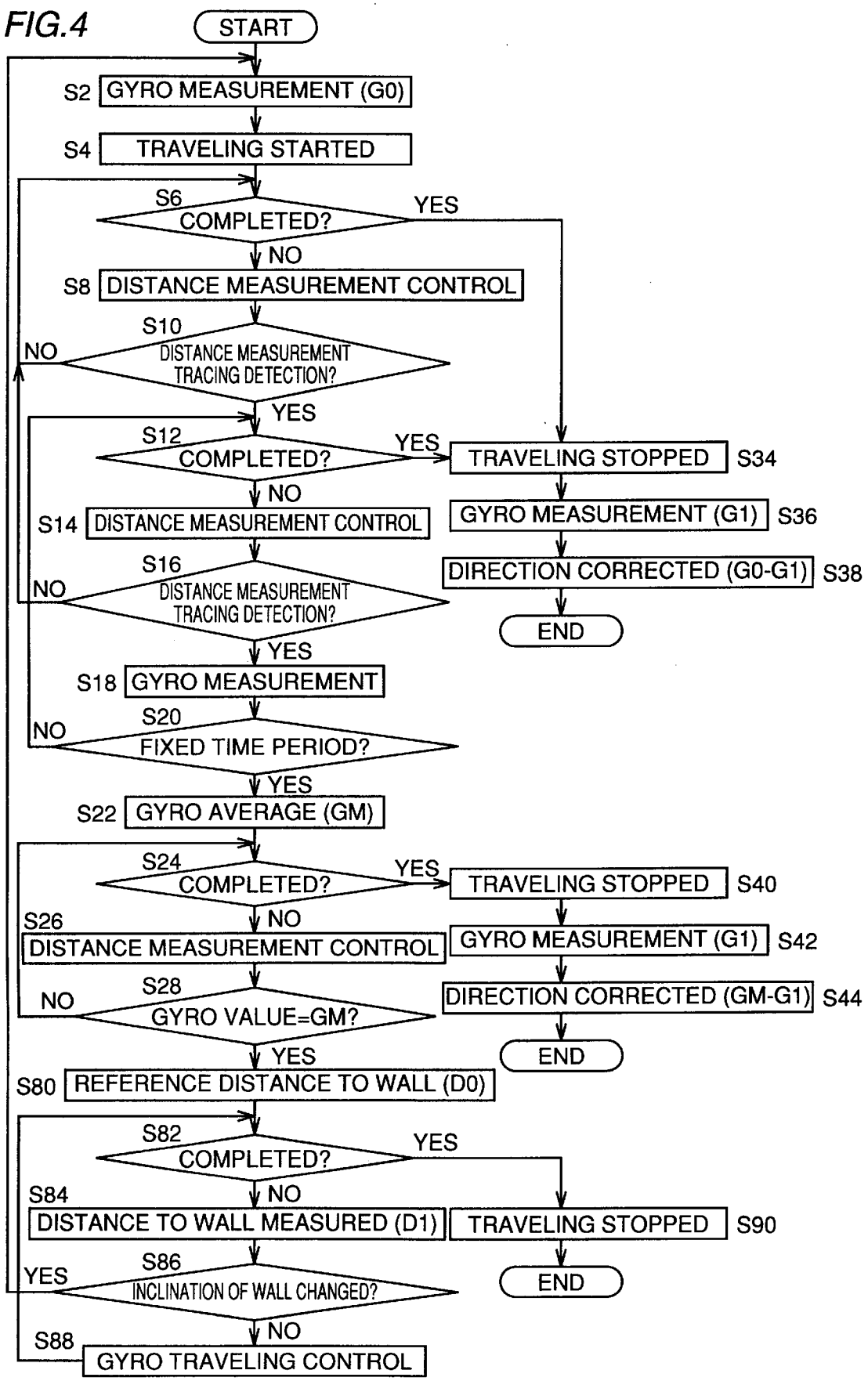
FIG. 4 is a first flow chart for use in illustration of traveling control of the autonomous vehicle according to the embodiment of the invention.
Figure 5:
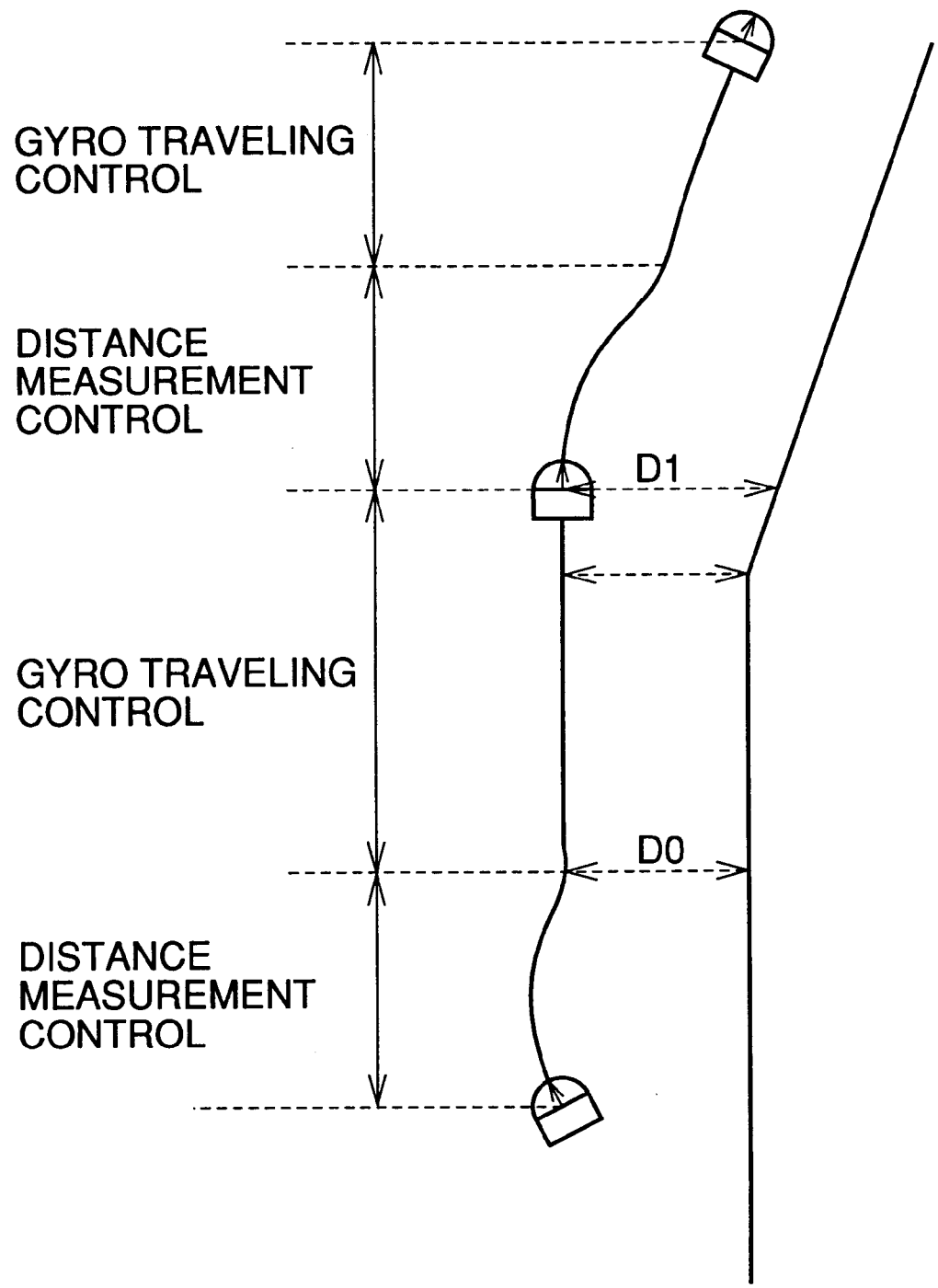
FIG. 5 is a diagram showing the procedure of traveling of the autonomous vehicle according to the embodiment of the invention.

Referring to FIGS. 3 to 5, a method of controlling traveling of autonomous vehicle 20 will be described. Before traveling, autonomous vehicle 20 uses gyro sensor 36 to measure a direction GO (S2) and starts traveling (S4, (1) in FIG. 3). Then, autonomous vehicle 20 makes a completion determination as to whether or not to complete traveling control (S6). If the traveling is to be completed, the traveling of autonomous vehicle 20 is stopped (S34). After measuring a direction G1 at the time (S36), the direction is corrected by (G0–G1) so that the direction of autonomous vehicle 20 is returned to the state before traveling (S38, (8) in FIG. 3). Thus, when autonomous vehicle 20 is not parallel to the wall at the end of traveling, the vehicle will stop in a state not shifted from a parallel state at the start of traveling.

If the traveling is not completed in S6, driving unit 41 is controlled such that the distance between autonomous vehicle 20 and the wall detected by distance measurement sensor 38 is equal to the distance therebetween at the start of traveling (S8, (2), (3), (4) in FIG. 3). The operations from S6 to S8 are repeated until autonomous vehicle 20 travels parallel to the wall (S10). After autonomous vehicle 20 has traveled parallel to the wall for a prescribed time period, it is determined that a distance measurement tracing has been made (S10, (5) in FIG. 3), and then the average of values of gyro sensor 36 for a fixed time period (hereinafter referred to as gyro average GM) is measured (S18, S20, S22, (6) in FIG. 3). Gyro average GM indicates the direction parallel to the wall. During the period, it is determined whether or not autonomous vehicle 20 travels parallel to the wall as is the case with S6 to S10 (S12, S14, S16).

If the vehicle stops traveling before the passage of a fixed time period (NO in S20, YES in S12), processes in and after step 34 will be executed. The above-described control is referred to as "first correction mode" and the period thereof is given in FIG. 3. In the first correction mode, autonomous vehicle 20 is controlled to travel parallel to the wall, and the direction of autonomous vehicle 20 when it reaches a parallel state (gyro average GM) is produced to obtain a direction parallel to the wall.

After gyro average GM is produced after the passage of a fixed time period (S22), and the traveling of autonomous vehicle 20 is determined to be completed (YES in S24), the traveling of autonomous vehicle 20 is stopped (S40). Direction G1 at the time is measured from the output of gyro sensor 36 (S42), the direction of autonomous vehicle 20 is corrected by (GM−G1) such that the direction is parallel to the wall (S44, (9) in FIG. 3). The control from S40 to S44 as described above is referred to as "second correction mode", and the period thereof is given in FIG. 3. The second correction mode corresponds to control when autonomous vehicle 20 travels generally parallel to the wall but locally not parallel to the wall, and the direction of autonomous vehicle 20 is corrected to be parallel to the wall after it stops traveling.

If a traveling completion has not been determined (NO in S24), traveling control (distance measuring control) by distance measurement sensor 38 is performed until the gyro value of gyro sensor 36 is equal to gyro average GM produced in S22 (S26, S28, (7) in FIG. 3). After the gyro value of gyro sensor 36 is equal to gyro average GM, the distance to the wall D0 is measured (S80). Thereafter, traveling control (gyro traveling control) basically using the gyro value is performed. However, to cope with the case in which the direction of a wall changes, the following control is performed. Autonomous vehicle 20 once again measures distance D1 to the wall using distance measurement sensor 38 (S84). D0 and D1 are compared to determine whether or not the angle formed between the proceeding direction of autonomous vehicle 20 and the wall has changed (S86).

If the direction has not changed (NO in S86), traveling control is continued to bring the gyro value to the level of GM (S88, (10) in FIG. 3). If the angle to the wall has changed (YES in S86), traveling control by distance measurement sensor 38 is resumed (S2). Through these controls, if the direction of the wall changes during traveling, autonomous vehicle 20 changes its proceeding direction and can travel again parallel to the wall. Note that during traveling control using the gyro value, distance D1 to the wall is measured (S84), it is constantly determined whether or not the angle formed between the proceeding direction of autonomous vehicle 20 and the wall has changed (S86), and if a traveling completion determination is made during the period (YES in S82), the traveling is stopped at the position (S90). At the time, the direction is not corrected after stopping traveling. The above-described control from S26 to S28 and S80 to S90 is referred to as "third correction mode", and the period thereof is given in FIG. 3. In the third correction mode, gyro sensor 36 is used to control the proceeding direction of autonomous vehicle 20. Thus, autonomous vehicle 20 can travel along a direction locally parallel to the wall as well (gyro average GM). Therefore, the direction does not have to be corrected when the vehicle stops traveling, and the vehicle can always stop parallel to the wall.

Figure 6:
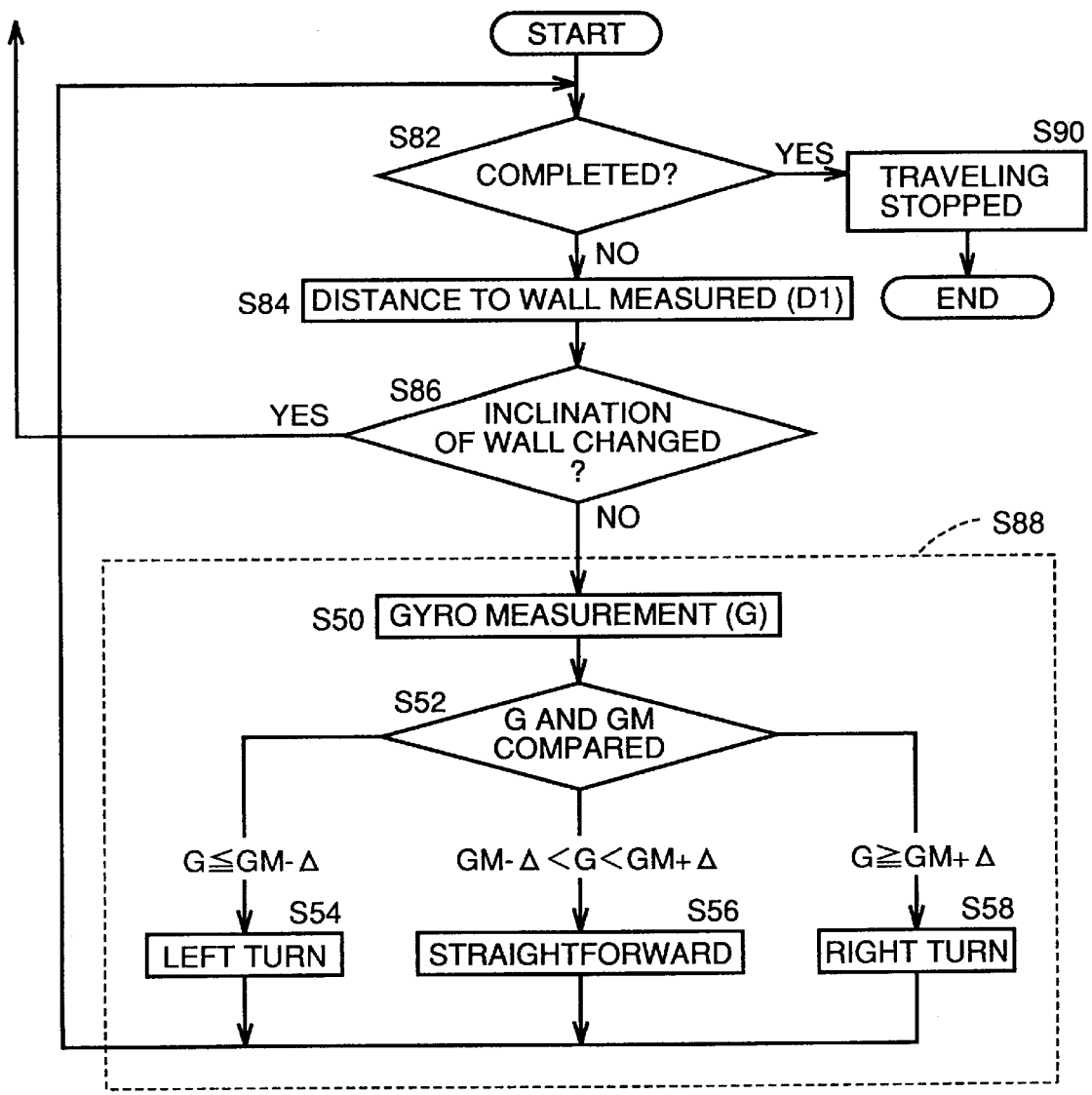
FIG. 6 is a second flow chart for use in illustration of traveling control of the autonomous vehicle according to the embodiment of the invention.

Referring to FIG. 6, a gyro traveling controlling method to control the gyro value of gyro sensor 36 to be at the level of GM will be described ((S88) in FIG. 4). Using gyro sensor 36, gyro value G is produced (S50). Gyro value G and gyro average GM produced in S22 are compared (s52). If gyro value G is within a prescribed range Δ (GM−Δ<G<GM+Δ), autonomous vehicle 20 proceeds straightforward (S56). If gyro value G is shifted to the right by at least $\Delta(G \leq GM-\Delta)$, autonomous vehicle 20 turns to the left (S54). If gyro value G is shifted to the left by at least $\Delta(G \geq GM+\Delta)$, the direction of autonomous vehicle 20 turns to the right (S58). Thus, the moving direction of autonomous vehicle 20 can always be set to the level of GM, and autonomous vehicle 20 can travel parallel to the wall.

Figure 7:
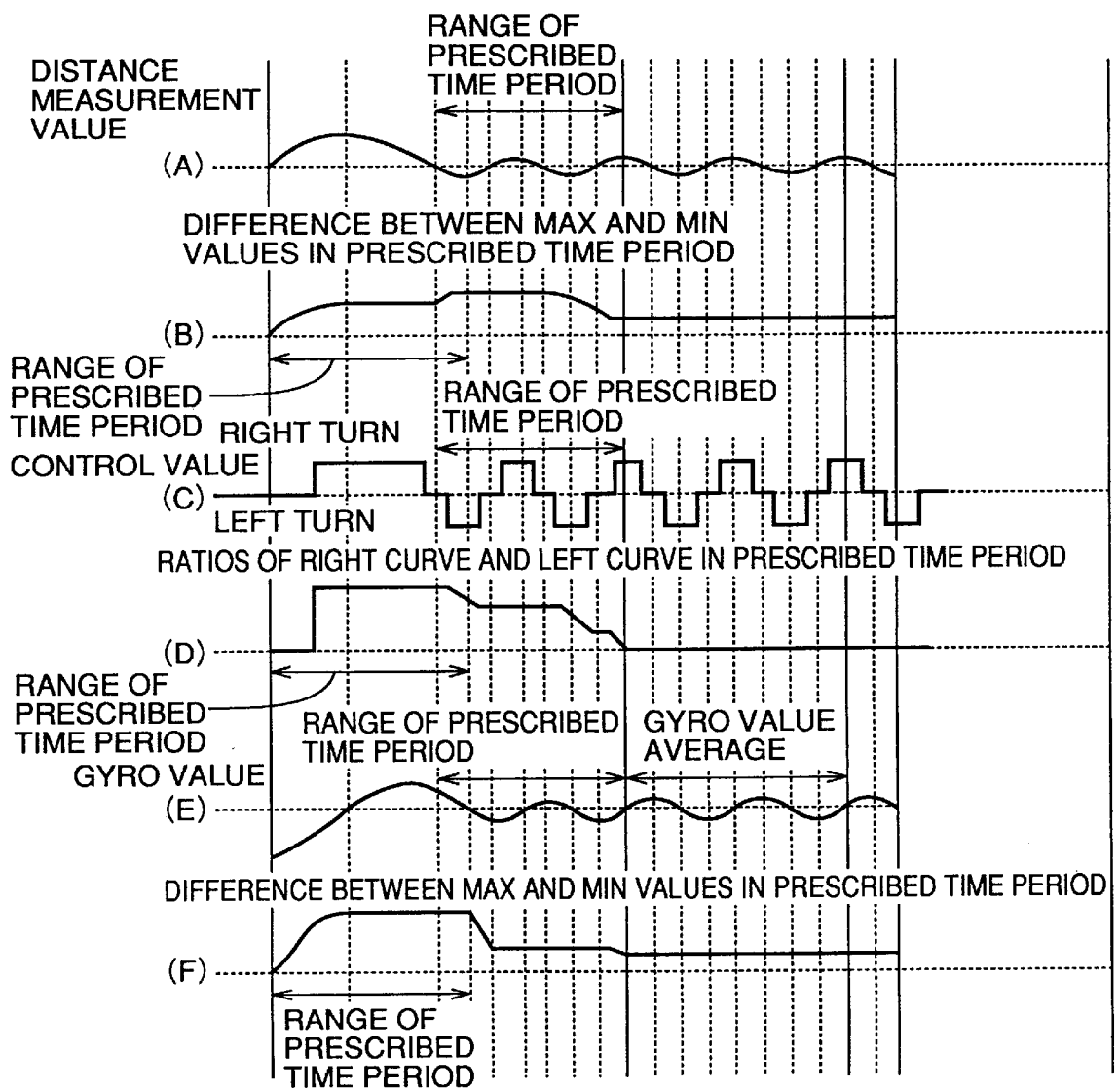
FIG. 7 is a graph showing measured values on the autonomous vehicle according to the embodiment of the invention.

Referring to FIG. 7, a distance measurement tracing detection in FIG. 4(S10, S16) will be described. In the distance measurement tracing detection, there are three kinds of methods, in other words, a detection method using the distance to a wall output from distance measurement sensor 38 (distance measurement value), a detection method using the control value of driving unit 41 when distance measurement control is performed to make the vehicle parallel to the wall (S8, S14 in FIG. 4), and a detection method using a gyro value output from gyro sensor 36. In the methods using distance measurement value ((A) in FIG. 7) and the gyro value ((E) in FIG. 7), if the difference between the maximum and minimum values ((B), (F) in FIG. 7) during a prescribed period is within the range of prescribed values, it is determined that autonomous vehicle 20 has traveled parallel to the wall during the prescribed time period. In the method using the control value ((C) in FIG. 7), if the ratios of a time period for turning autonomous vehicle 20 to the right in the prescribed time period and a time period for turning the vehicle to the left in the prescribed time period((D) in FIG. 7) are substantially equal, it is determined that the vehicle has traveled parallel to the wall during the prescribed time period. Note that the control value is produced based on the rotation amount and velocity, the output values of encoder 34.

Figure 8A:
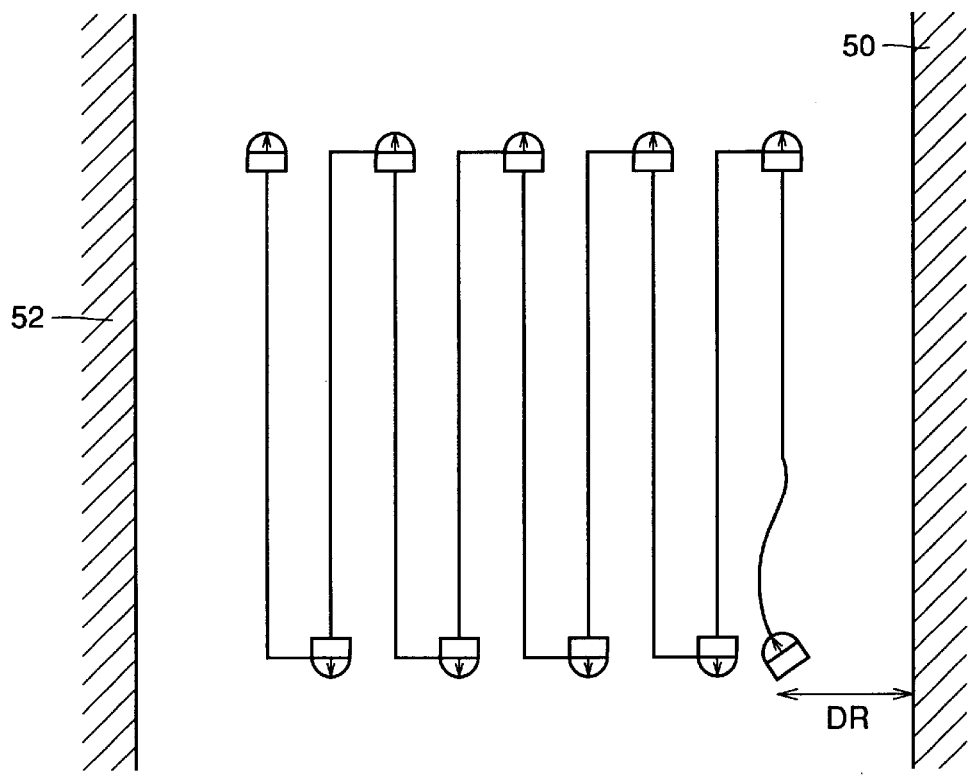
FIGS. 8A and 8B are diagrams showing the procedure of traveling of the autonomous vehicle according to the embodiment of the invention.
Figure 8B:
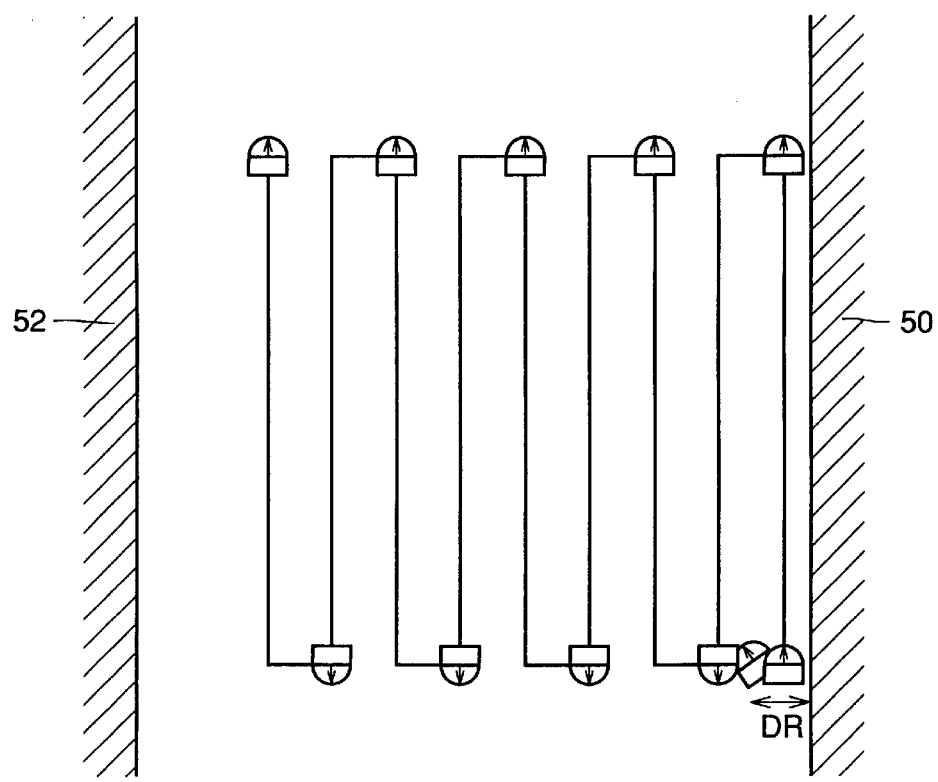
Figure 9:
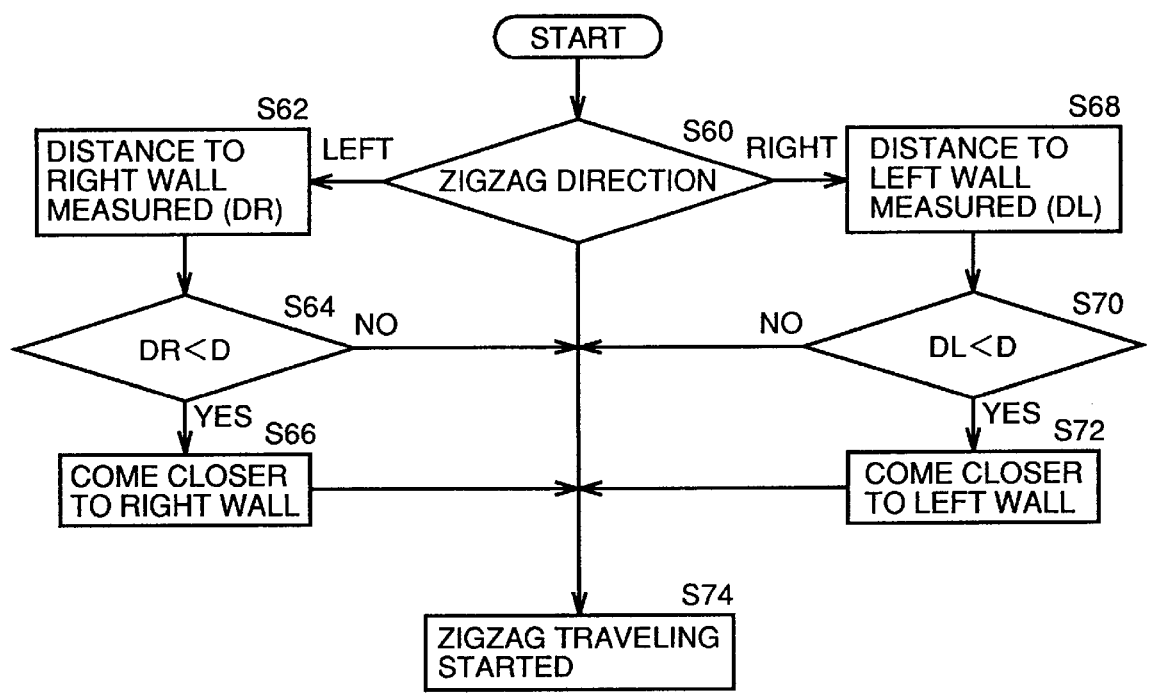
FIG. 9 is a flow chart for use in illustration of traveling control of the autonomous vehicle according to the embodiment of the invention.

Referring to FIGS. 8A, 8B and 9, a series of operations when the vehicle reciprocates within a work area will be described. The series of operations is hereinafter referred to as "zigzag traveling".

At the start of traveling, the user specifies the direction in which autonomous vehicle 20 makes zigzag traveling while moving among courses, using as a reference the straightforward direction of autonomous vehicle 20 (S60). If the zigzag traveling is performed to the left from the straightforward direction at the start of traveling, autonomous vehicle 20 measures a distance DR to a right wall 50, using distance measurement sensor 38 on the right (S62). If distance DR is smaller than a prescribed value D (FIG. 8B), autonomous vehicle comes near the wall until contact distance measurement sensor 39 comes into contact with right wall 50, and then starts traveling in the same manner as shown in FIG. 4. At the time, during a single straightforward movement, in place of distance measurement sensor 38 described in conjunction with FIG. 4, contact distance measurement sensor 39 is used to control traveling. If distance DR is not less than prescribed value D, traveling is initiated from that position according to the procedure of operation in FIG. 4 (S74). If the zigzag traveling is performed to the right from the straightforward direction at the start of traveling, distance measurement sensor 38 on the left is used to measure a distance DL to a left wall 52 (S68), and the same traveling control is performed (S70, S72, S74).

Autonomous vehicle 20 can move straightforward, and travel/stop parallel to a wall at a high precision.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An autonomous vehicle, comprising:
   a body;
   direction detection means attached to said body for detecting the moving direction of said body;

driving means for moving said body; and control means for controlling said driving means to move straightforward and/or turn said body, said control means including first direction correction means receiving the output of said direction detection means for correcting the moving direction of said body after traveling based on the difference between the directions of said body before and after traveling.

2. The autonomous vehicle as recited in claim 1, further comprising distance detection means attached to said body for measuring the distance to a wall positioned facing a side of the body, said control means further including parallel traveling control means receiving the output of said distance detection means for controlling said body to travel parallel to said wall.

3. The autonomous vehicle as recited in claim 2, further comprising distance measurement tracing determination means for determining that said body travels parallel to said wall for a prescribed period under the control of said parallel traveling control means, said control means including:

average direction calculation means receiving the output of said direction detection means for obtaining the average direction of said body for a fixed time period after receiving a determination result that said body travels parallel to said wall from said distance measurement tracing determination means;

second direction correction means for correcting the direction of said body after traveling based on the difference between said average direction output from said average direction calculation means and the direction of said body after traveling output from said direction detection means, and stop mode changing means for correcting the direction after traveling by said first direction correction means if said body stops traveling before the average direction of said body is obtained by said average direction calculation means and for correcting the direction after traveling by said second direction correction means if said body stops traveling after the average direction of said body is obtained by said average direction calculation means.

4. The autonomous vehicle as recited in claim 3, wherein said distance measurement tracing determination means determines that said body travels parallel to said wall if the difference between the maximum and minimum values of the distance output from said distance detection means during a prescribed time period is within the range of prescribed values.

5. The autonomous vehicle as recited in claim 3, wherein said distance measurement tracing determination means determines that said body travels parallel to said wall if the difference between the maximum and minimum values of the direction during traveling output from said direction detection means in a prescribed time period is within the range of prescribed values.

6. The autonomous vehicle as recited in claim 3, wherein said control means further includes means for calculating a rightward or leftward moving direction control period during which a control signal to move said body rightward or leftward is output, and said distance measurement tracing determination means determines that said body travels parallel to said wall, if the ratios of the rightward moving direction control period and the leftward moving direction control period in a prescribed time period are substantially equal.

7. The autonomous vehicle as recited in claim 3, wherein said control means further includes third direction correction means for correcting the direction during traveling based on said average direction and the direction during traveling output from said direction detection means, after the average direction of said body is obtained by said average direction calculation means, said stop mode changing means corrects the direction after traveling by said first direction correction means if said body stops traveling before the average direction of said body is obtained by said average direction calculation means, and corrects the direction after traveling by said second direction correction means if said body stops traveling after the average direction of the body is obtained by the average direction calculation means and before said third direction correction means starts correcting the direction during traveling, and the direction after traveling is not corrected if said body stops traveling thereafter.

8. The autonomous vehicle as recited in claim 2, further comprising distance measurement contact detection means attached to said body for measuring the distance to said wall in contact with said wall, said distance detection means including distance non-contact detection means for measuring the distance to said wall in a non-contact state, said control means including, contact parallel traveling control means receiving the output of said distance contact detection means for controlling said body to travel parallel to said wall, and means receiving the distance between said body and said wall before traveling output from said distance non-contact detection means for starting said body to travel from a position at the time by said parallel traveling control means and for starting said body to travel by said contact parallel traveling control means by moving said body until said distance contact detection means comes into contact with the wall if said distance is smaller than a prescribed value.

9. The autonomous vehicle as recited in claim 8, wherein said control means further includes contact distance measurement tracing determination means for determining that said body travels parallel to said wall during a prescribed period by said contact parallel traveling control means, and said contact distance measurement tracing determination means determines that the body travels parallel to the wall if the difference between the maximum and minimum values of the distance output from said distance contact detection means during a prescribed period in the past is within the range of prescribed values.

10. The autonomous vehicle as recited in claim 8, wherein said control means further includes wall direction change detection means for detecting a change in the direction formed between the moving direction of said body and said wall based on an output received from said distance detection means, and said parallel traveling control means responds to the output of said wall direction change detection means to resume control such that said body travels parallel to the wall by said parallel traveling control means.

11. An autonomous vehicle, comprising:

a body;

a driving wheel, a gyro sensor attached to said body for detecting the moving direction of said body;

a motor for driving said driving wheel; and a control unit for controlling said motor to move straightforward and/or turn said body, said control unit correcting the direction of said body after traveling based on the difference between the directions before and after traveling based on an output received from said gyro sensor.

12. The autonomous vehicle as recited in claim 11, further comprising a distance detection sensor attached to said body for measuring the distance to a wall positioned facing a side of the body, said control unit controlling said body to travel parallel to said wall based on an output received from said distance detection sensor.

13. The autonomous vehicle as recited in claim 11, comprising a distance detection contact sensor attached to said body for measuring the distance to said wall positioned facing a side of the body in contact with said wall, and a distance detection non-contact sensor attached to said body for measuring the distance to said wall positioned facing the side of the body in a non-contact state to said wall, said control unit controlling said body to travel parallel to said wall based on an output received from said distance detection contact sensor and said distance detection non-contact sensor.

14. A method of controlling an autonomous vehicle having a driving wheel to control a body to travel and turn in an arbitrary direction by controlling said driving wheel, comprising:

a step of direction detecting to detect the moving direction of said body before traveling;

determining that the moving direction of said body after traveling is different from the moving direction of said body before traveling; and operating said driving wheel such that the moving direction of said body after traveling is in coincidence with the moving direction of said body before traveling by correcting the moving direction of the body by a prescribed amount if the moving direction after traveling is different from the moving direction before traveling.

15. The method of controlling an autonomous vehicle as recited in claim 14, further comprising the steps of:

measuring the distance between said body after traveling and a wall positioned facing a side of said body; and a step of parallel traveling to operate said driving wheel such that said body travels parallel to said wall.

16. The method of controlling an autonomous vehicle as recited in claim 14, wherein said parallel traveling step further includes a distance measurement tracing determination step of determining that said body travels parallel to said wall during a prescribed time period, said method further comprising the steps of:

in said distance measurement tracing determination step, calculating the average direction of said body for a fixed time period after receiving a determination result that said body travels parallel to said wall;

a second direction correction step of correcting the direction after traveling based on the difference between said average direction calculated in said average direction calculation step and the direction after traveling calculated in said direction detection step; and a step of stop mode changing for correcting the direction after traveling by said first direction correction step if said body stops traveling before the average direction of said body is obtained in said average direction calculation step and correcting the direction after traveling by said second direction correction step if said body stops traveling after the average direction of said body is obtained in said average direction calculation step.

17. The method of controlling an autonomous vehicle as recited in claim 16, wherein said distance measurement tracing determination step includes determining that said body travels parallel to said wall if the difference between the maximum and minimum values of the distance measured in said distance measurement step in a prescribed period is within the range of prescribed values.

18. The method of controlling an autonomous vehicle as recited in claim 16, wherein said distance measurement tracing determination step includes determining that said body travels parallel to said wall if the difference between the maximum and minimum values of the direction during traveling detected in said direction detection step in a prescribed period is within the range of prescribed values.

19. The method of controlling an autonomous vehicle as recited in claim 16, further comprising calculating a rightward or leftward moving direction control period during which a control signal to move said body rightward or leftward is output, and said distance measurement tracing determination step determining that said body travels parallel to said wall if the ratios of the rightward moving direction control period and the leftward moving direction control period output from said control means in a prescribed period are substantially equal.

* * * * *